UNITED STATES PATENT OFFICE.

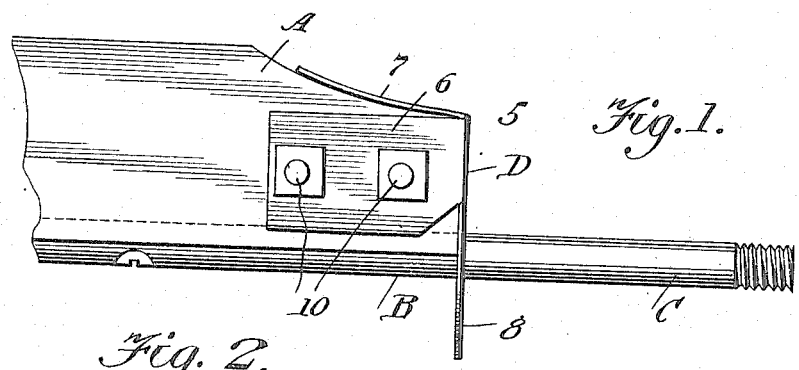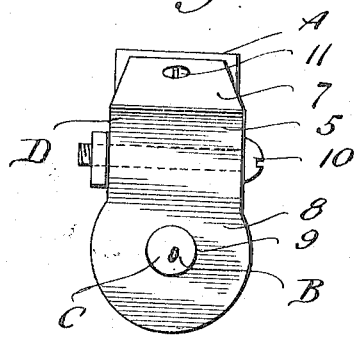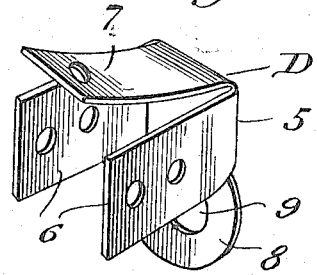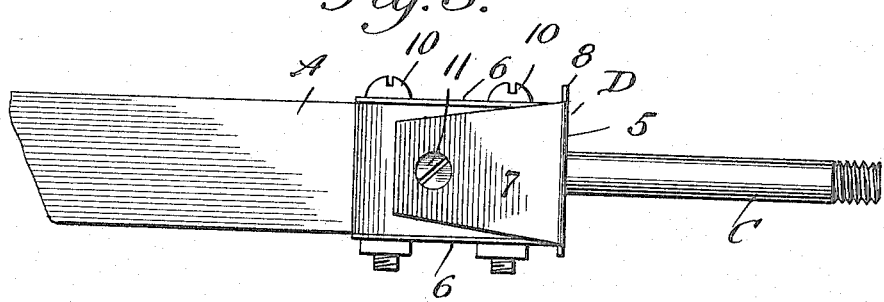

DE WITT C. OEHLER, OF HOPKINTON, IOWA.

AXLE-CLIP.

1,133,173.

Specification of Letters Patent.   Patented Mar. 23, 1915.

Application filed October 31, 1914.   Serial No. 869,661.

*To all whom it may concern:*

Be it known that I, DE WITT C. OEHLER, a citizen of the United States, residing at Hopkinton, in the county of Delaware and State of Iowa, have invented new and useful Improvements in Axle-Clips, of which the following is a specification.

The invention relates to clips and more particularly to the class of axle clips for use on coasters or other wagons.

The primary object of the invention is the provision of a clip of this character wherein the same will receive the axle for the fastening of the same in position on the bolster and serve as a facing for the end of the bolster to protect the same from the hub of the wheel which will frictionally rub thereon.

Another object of the invention is the provision of a clip of this character wherein the same will conveniently fit over the end of the bolster so as to serve as a washer for the wheel of the wagon when journaled upon the axle and also which will serve to fasten the axle to the bolster and prevent the said axle from leaving its position relative to the bolster upon being subjected to a sudden severe strain or jolt and at the same time reinforce the bolster at the end thereof.

A still further object of the invention is the provision of a clip of this character which is extremely simple in construction, strong, durable, thoroughly reliable and efficient in its purpose, and inexpensive in manufacture.

With these and other objects in view the invention consists in the features of construction, combination and arrangement of parts as will be hereinafter fully described, illustrated in the accompanying drawings and pointed out in the claim hereunto appended.

In the drawings:—Figure 1 is a fragmentary front elevation of a wagon bolster, showing the axle connected thereto and the clip constructed according to the invention applied. Fig. 2 is an end elevation thereof. Fig. 3 is a top plan view. Fig. 4 is a perspective view of the clip detached from the bolster and axle.

Similar reference characters indicate corresponding parts of the several views in the drawings.

Referring to the drawings in detail A designates a portion of a bolster employed in the construction of a coaster wagon for use by children and B a portion of an axle which is of the rod type, having a spindle end C as usual which projects beyond the end adjacent thereto of the bolster for supporting the wheel of the wagon. Receiving the axle B and fixed to the bolster A at its end next to the axle spindle C is a clip D hereinafter fully described.

The clip is cut from a blank of metal although it may be a casting and is preferably made from steel to form a body 5 from which project at right angles thereto side and top wings 6 and 7 respectively, while the body 5 is formed with a circular or disk like terminal 8 providing a wheel washer, the terminal 8 being centrally perforated or formed with an opening 9 which is adapted to receive the axle B so that when the wheel is placed upon the axle spindle C the inner end of the hub will contact with the terminal 8 and rub against the same during the rotation of the wheel so as to avoid wear upon the end adjacent thereto of the bolster A, the axle B being secured in the usual well known manner to the bolster A at the bottom thereof.

Passed through the side wings 6 are bolt members 10 which are also passed through the bolster A for the fastening of the clip upon the end of the latter, the side wing 6 being disposed at opposite sides of the bolster while the top wing 7 overlies a portion of the said bolster and has passed therethrough a screw 11 which secures the top wing 7 to the bolster.

It will be noticed that the clip when mounted upon the bolster A materially reinforces the end thereof while the terminal 8 of the clip serves as a washer for the inner end of the hub of the wheel to avoid wear upon the end adjacent thereto of the bolster.

From the foregoing it is thought that the construction and operation of the invention will be clearly understood and therefore a more extended explanation has been omitted.

What is claimed is:—

A clip of the class described comprising a body having a perforated disk like terminal adapted to receive an axle of a wagon, wings projecting at right angles to the body from the side and top edges thereof, and adapted to embrace the end of a bolster of a wagon, and means passed through the wings and also adapted to be passed through the bolster for securing the same together.

In testimony whereof I affix my signature in presence of two witnesses.

DE WITT C. OEHLER.

Witnesses:
A. W. McDONALD,
H. M. JOHNSON.